United States Patent
Gereb

(10) Patent No.: US 9,510,123 B2
(45) Date of Patent: Nov. 29, 2016

(54) METHOD AND SYSTEM FOR SOURCE SELECTIVE REAL-TIME MONITORING AND MAPPING OF ENVIRONMENTAL NOISE

(71) Applicant: BUDAPESTI MUSZAKI ES GAZDASAGTUDOMANYI EGYETEM, Budapest (HU)

(72) Inventor: Gabor Gereb, Budapest (HU)

( * ) Notice: Subject to any disclaimer, the term of this patent is extended or adjusted under 35 U.S.C. 154(b) by 51 days.

(21) Appl. No.: 14/390,056

(22) PCT Filed: Dec. 17, 2012

(86) PCT No.: PCT/IB2012/057389
§ 371 (c)(1),
(2) Date: Oct. 2, 2014

(87) PCT Pub. No.: WO2013/150349
PCT Pub. Date: Oct. 10, 2013

(65) Prior Publication Data
US 2015/0110276 A1    Apr. 23, 2015

(30) Foreign Application Priority Data
Apr. 3, 2012   (HU) .................................. 1200197

(51) Int. Cl.
H04R 29/00    (2006.01)
G01H 3/12    (2006.01)

(52) U.S. Cl.
CPC ............ *H04R 29/008* (2013.01); *G01H 3/125* (2013.01)

(58) Field of Classification Search
None
See application file for complete search history.

(56) References Cited

U.S. PATENT DOCUMENTS

| | | | | |
|---|---|---|---|---|
| 7,146,013 | B1* | 12/2006 | Saito | H04R 3/005 381/92 |
| 2002/0055913 | A1* | 5/2002 | Rajan | G10L 21/028 706/19 |
| 2008/0181430 | A1* | 7/2008 | Zhang | H04R 1/406 381/92 |
| 2015/0110276 | A1* | 4/2015 | Gereb | H04R 29/008 381/56 |

OTHER PUBLICATIONS

Machine Translation of Oohashi et al., JP 2006-038772A, published Feb. 9, 2006.*

* cited by examiner

*Primary Examiner* — Peter Vincent Agustin
(74) *Attorney, Agent, or Firm* — Dowell & Dowell, PC

(57) ABSTRACT

A method for source selective real-time monitoring and mapping of environmental noise, comprising the steps of ● identifying sources in the area; ● designing places for the monitoring stations; ● creating a data collecting and data processing center; ● measuring the noise impact, and observation of the sources with the sensors; ● defining the noise propagation; ● assemblying the monitoring stations including a sound measuring device, a computing unit and a communication unit; ● determining the resultant noise impact prevailing in the respective measurement points; ● determining the sources dominant in the individual moments on the basis of the data of the sensors; ● determining the average noise impact of the respective sources for a longer period; ● obtaining an average noise impact; ● extending the measurement into a noise impact map; ● calculating the effective noise impact of every noise source in every point of the area for every period; ● producing the effective noise impact map of the respective periods.

9 Claims, 4 Drawing Sheets

METHOD AND SYSTEM FOR SOURCE SELECTIVE REAL-TIME MONITORING AND MAPPING OF ENVIRONMENTAL NOISE

Present invention relates, on the one hand, to a method for source selective real-time monitoring and mapping of environmental noise, comprising the steps of surveying of the area, in the course of which the sources must be identified which affect the noise impact prevailing in the respective points of the area; designing, in view of the sources, one or several measurement point(s) where the monitoring stations will be placed; after the installation of one or several monitoring station(s), creating a data collecting and data processing centre, measuring the noise impact in the measurement points, and observing the respective sources with the sensors.

Present invention relates, on the other hand, to a system for the real-time, source selective monitoring of environmental noise comprising one or several measurement points comprising an environmental noise detecting monitoring station; a communication device transmitting the data collected by the monitoring station; a processing device receiving the data transmitted by the communication device; where the processing device is equipped with a storage means for storing the received and the processed data, respectively; and further comprising a display means associated with the processing device.

BACKGROUND ART

Recently two methods are available for the determination of environmental noise impact: model space calculation and on-site instrumental measurement. Both the correlations, constituting the basis of modelling and the structure of the instrument applied for measurement and the measuring requirements look back on a past of several decades. However, with the development of technology, the barriers mainly the information technological ones of noise impact determination have been eliminated one after the other. In regard of model calculations, noise mapping and in that of on-site measurement the appearance of real-time monitoring represented the breakthrough. The former opened the way to the graphic representation of the spatial distribution of the noise impact, whereas the latter has made it possible to produce a continuous time function being updated in real time. U.S. Pat. No. 7,092,853 discloses an environmental noise monitoring system which records and analyses environmental noise. The system is capable of sampling, processing and storing equivalent sound level values throughout a period of even two weeks. It is capable of showing the recorded data as chart and to detect automatically the indicated noise events subjected to observation. The measuring system conforms to IEC standards Type I or II. In the applied procedure, the detected noise is weighted by various frequency filters according to the national or international noise measurement standards; detected and weighted noise is converted into appropriate data, and data collection and processing is controlled through a communication interface, and then the values concerned are processed and displayed with the help of an analytical unit. The solution emphasises the filtering and compression of the detected values, and on the compliance of noise measurement with the various national and international standards and the provision of adequate results.

EP 1273927 A1 discloses a system and a method for environmental noise monitoring. The system comprises three or more sensor and converters, arranged in the environment comprising the noise source or noise sources at different places, and each sensor is omnidirectional. With the help of sensors located at different places, it can also delimit the direction of the noise sources with the help of sampled noise signal pairs, where it identifies by calculation the local maxima and determines the main noise source coming from a given direction, and detects noises coming from other directions and also their respective noise levels.

U.S. Pat. No. 7,266,494 discloses a method and an equipment identifying the noise environment from noise signals.

US 2010/0094625 A1 discloses methods and equipment for noise estimation. The solution is capable of detecting speech activity, taking into consideration the known differences between speech signals and the spectrum of ambient noise. The solution applies to noise detection in general.

A document entitled "Assessment of Environmental Noise Problems in Cluj-Napoca for an Appropriate Noise Management Plan" relates to environmental noise measurement. WO2011/045499 A1 discloses a method for the observation, estimation and reduction of the acoustic energy level of noise sources in aquatic environments, e.g. in lakes and seas, where a noise transmission source, e.g. a ship, is present in the aquatic environment. According to the method, the acoustic propagation of the noise source is modelled in real time, and the momentary position of the noise transmission source is determined from a database and when that is known, the desired parameters of the noise waves propagating in space from the noise transmission source are determined.

US 2010/0280826 A1 relates to the separation and monitoring of noise sources, and solves partly the issue of the determination of the location of the bundle reflected from the noise source and partly the filtering out of the noises associated with the original noise signals primarily through the useapplication of electromagnetic radiation, e.g. of laser beams. The applied beams let the respective noise sources be separated from one another completely.

US 2008/0056506 A1 discloses a structural noise source forecasting method to estimate the place and approximate measure of noises created after implementation already in the planning phase. The method covers also noise calculation.

Pages 2427-2443 of Issue 13, Vol. 14 of the periodical International Journal of Remote Sensing presents a regional noise estimation and management system comprising remote sensing and capable of providing information on the propagation of noise.

JP 2003156388 A relates to a method and an equipment for the detection of environmental noises and a data storage medium. During the solution, noise data are collected from a region regarded as several independent noise sources, and environmental noises are also taken into account. The solution refers primarily to the measurement and monitoring of noise indoors and in particular in buildings.

JP 2005190177 A discloses a system monitoring environmental noise effects, which can be applied e.g. also on construction sites where the noise sources may be noises created at certain decisive places/equipment of the construction works. The measured data are collected and forwarded via a communication network to an evaluation centre which carries out the evaluation of the parameters being sought based on the noise and vibration measurements.

EP 1 720 129 A1 discloses a method for studying and eliminating environmental noise pollutions, which measures the noises being produced at several locations, and determine by calculation from the noise map the actions required to eliminate them. The document demonstrates the existence of the problems related to noise impact.

Existing Technical Problem

There is a specific demand in several areas of noise protection practice for a method capable of producing a real-time noise map offering the option of selection of noise impacts originating from the respective sources. These include, inter alia, the construction industry which would require the continuous inspection of the noise impact of a dynamic area source, usually against significant background noise. The combined knowledge of the temporal and spatial distribution of the noise impact would be a major step forward also in the surroundings of traffic nodes. Moreover, real-time noise mapping which would allow the comprehensive examination of the noise impact could contribute also to the development of noise reduction plans in areas struggling with noise impact.

OBJECT OF THE INVENTION

The solution is based on two new concepts. According to the first, a noise monitoring station, complemented with sensors capable of measuring the characteristics of noise sources, can break down the resultant noise impact into the sum of noise impacts by source. According to the second, it is possible to calculate the continuously updated noise map of an entire area based on the data of the source selective noise monitoring at the reference points of the given area, provided that the noise propagation conditions are known and can be regarded as being time-invariant.

In the dominant periods of individual environmental noise sources active in a specific area, one can observe physical phenomena such as e.g. source direction, time and frequency characteristics, volume, movement etc. on the basis of which the dominant noise sources of a given period can be identified with the help of appropriate sensors and a decision-making algorithm. Thus the resultant noise impact level defined by simultaneous noise monitoring can be broken down into noise impact levels originating from specific sources. This is conditional on that the assessment time of the noise impact should be much longer than the sampling time of the source characteristics and the resultant noise impact. Where a number S of environmental noise sources are active in a given area, and the noise impact needs to be calculated at a number R of area points, then if the number S×R of noise propagation coefficients is known and the separated noise impact of the number S of sources in one of the number M of (reference) points is determined, it is possible to calculate the approximate value of the noise impact in the remaining number R−M of (virtual measurement) point(s), provided that the noise propagation conditions of the area can be regarded as being time-invariable in the examined period, and the total noise source impact, dominant and relevant in at least one of the number R of area points is measurable in one of the reference points.

SUMMARY OF THE INVENTION

The invention is based on such already existing technologies as real-time environmental noise monitoring and environmental noise mapping, and its objective is to enable the real-time source selective monitoring of environmental noise and the real-time updating of noise maps by upgrading the current state of the art by two new measures. This makes it necessary to complement the noise monitoring system with sensors observing the noise sources (direction-sensitive microphones, cameras etc.), a decision-making algorithm and a special calculation algorithm for noise mapping which performs the updating of the available noise map.

The system makes sensorial observations during the real-time measurement of the environmental noise level in one or several reference points, on the basis of which the decision-making algorithm marks the dominant noise sources and breaks down the resultant noise impact level to source constituents. Following the determination of the noise impact levels originating from the respective sources with reference to the reference points, it calculates the approximate effective noise impact value in the grid points of the noise map on the basis of the quasi time-invariant noise propagation factors typical of the noise propagation conditions of the area, defined by model calculation in advance, different by emission-impact point pairs. The calculation is repeated cyclically in every reference time period.

Said task has been solved on the one hand by a method for source selective real-time monitoring and mapping of environmental noise, comprising the steps of surveying of the area, in the course of which the sources must be identified which affect the noise impact prevailing in the respective points of the area; designing, in view of the sources, one or several measurement point(s) where the monitoring stations will be placed; after the installation of one or several monitoring station(s), creating a data collecting and data processing centre, measuring the noise impact in the measurement points, and observing the respective sources with the sensors, wherein, as the case may be, the sources are grouped and they are treated together in subsequent separations; the noise propagation conditions of the area are defined by noise modelling, during which the noise impact differences prevailing between the respective points of the area are determined for each source; the one or several measurement point(s) where the monitoring stations are placed are designated in view of the combined knowledge of sources and noise propagation conditions; in the course of the above, measurement points are defined so that each of the previously determined sources cause a significant noise impact in at least one measurement point; subsequently, the monitoring stations are assembled so that a calibrated sound pressure level measuring device, a computing unit capable of the pre-processing of the data and a communication unit capable of the transmission of the data are assigned to each monitoring station, and it is ensured that the sources contributing to the resultant noise impact in a dominant way be known at every moment and in every cycle; following the installation of one or several monitoring station(s), during the creation of a data collecting and data processing centre firstly, the resultant noise impact prevailing in the respective measurement points is determined by the summary of the data of one or several sound pressure level measuring devices, secondly, the sources dominant in the individual moments in time are determined on the basis of the data of the one or several sensors located on the one or several stations, during which the dominance of the sources is inferred to based on the specific parameter combinations, by putting all the data of the sensors into a single parameter space, and a decision is taken; then on the basis of the resultant noise impact known for the respective moments and the also known source dominance, the average noise impact of the respective sources is determined selectively for a longer period; during which the noise impact measured at a given moment in time is assigned to the noise source identified by the previous decision, and the datum is stored in the summing unit of the noise source, at the end of a predefined period, the summing units are aggregated, the sum is divided over the entire period, and the average noise impact is obtained; hence the specific average noise impact of every noise source is known for every period; then the measurement is extended into a noise impact map, so that, since the noise impact of every noise source is known for every period, and during installation, the noise impact difference between the points of the area have been determined also for every noise source, the effective noise impact of every noise source in every point of the area is calculated for every period, subsequently, those impacts are summarised in every point, every period, for all the noise sources, and on the basis of the resultant noise impact levels, the effective noise impact map of the respective periods is produced.

According to a preferred embodiment of the method, the noise impact is measured continuously in the measurement points and the respective sources are observed continuously by the sensors.

According to a further preferred embodiment of the method, the periodical noise impact of the respective sources is determined and the noise impact map is calculated.

According to a further preferred embodiment of the method, the noise impact map is updated in real time, by period, and the previous data are stored.

According to a further preferred embodiment of the method, a posteriori statistical analysis is performed on the basis of the previously stored data.

According to a further preferred embodiment of the method, the data collected in the measurement point are extended a posteriori into a noise impact map by using the noise impact difference values.

According to a further preferred embodiment of the method, the noise sources are identified on the basis of their spatial location, with a direction-sensitive microphone system, based on their frequency and time characteristics and on visual signals.

According to a further preferred embodiment of the method, the noise impact maps valid in the specific periods are produced by assigning different colours to the resultant noise impact levels.

According to a further preferred embodiment of the method, during installation, the identifier of the noise source which is dominant at the given moment is loaded manually, simultaneously with the measurement, and the sample series obtained that way is associated with the data of sensors and the system of decision-making rules is developed.

Said task has been solved on the other hand by a system for the real-time, source selective monitoring of environmental noise comprising one or several measurement points comprising an environmental noise detecting monitoring station; a communication device transmitting the data collected by the monitoring station; a processing device receiving the data transmitted by the communication device; where the processing device is equipped with a storage means for storing the received and the processed data, respectively; and further comprising a display means associated with the processing device. The monitoring station detecting environmental noise comprises sensors monitoring the noise sources in a selective way; the monitoring station detecting environmental noise comprises a calibrated sound pressure level measurement device, a computing unit capable of the pre-processing of the data and a communication unit capable of forwarding the data; the processing unit is designed as a processing unit which determines the average noise impact of the respective sources based on the resultant noise impact known for the specific moments in time and the also known source dominance for a longer period in a selective way, and in the meantime it assigns the nose impact measured at a given moment to a noise source identified on the basis of a previous decision and stores the datum in the summing unit of the noise source.

BENEFITS OF THE INVENTION

The invention can be used as a supplement to an existing system (in this case, costs of the preparation of the costly noise monitoring station and the noise propagation model are not incurred), or it can be installed in itself (in this case, the afore-mentioned costs need to be added). The estimated cost of the installation of the invention corresponds to a mere 10-30% of that of the noise monitoring station and the noise monitoring model constituting its basis.

One of the strongest application areas is the inspection of construction works in urban environments, since noise emission which is difficult to predict is produced in those areas, which may several emitting, i.e. responsible, parties, but we cannot ensure the objective determination thereof based on our current knowledge, which entails uncertainty and the unpredictability of penalties and other sanctions.

BRIEF DESCRIPTION OF THE DRAWINGS

The invention will be described in more detail on the basis of the attached drawings showing exemplary implementations of the proposed solution. In the drawings.

DETAILED DESCRIPTION OF A PREFERRED EMBODIMENT OF THE INVENTION

Figure 1:
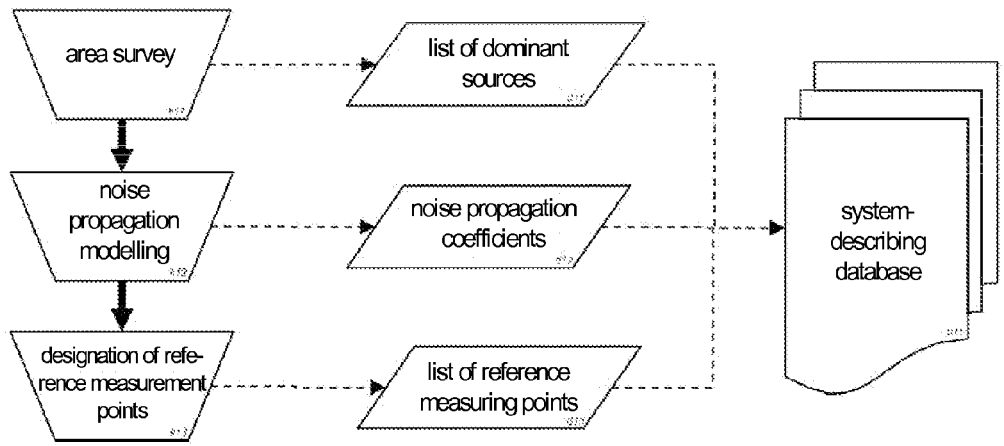
FIG. 1 shows a possible flow chart of the process of designing the system.
Figure 2:
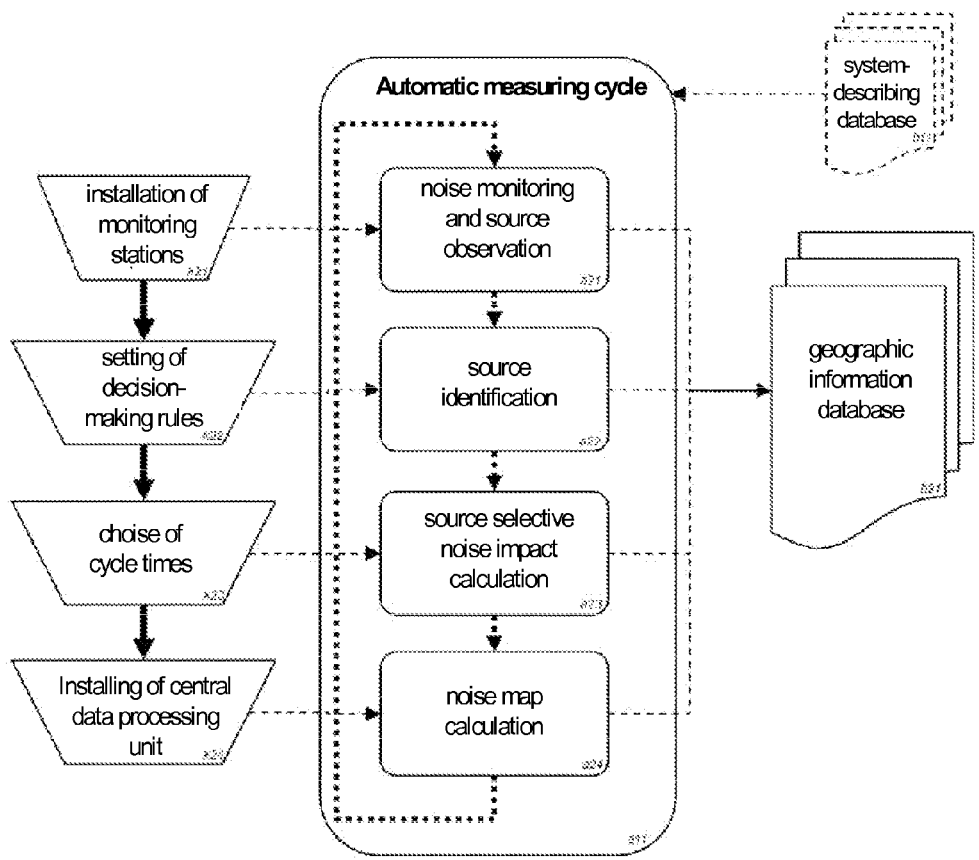
FIG. 2 shows a possible flow chart of the process of the installation of the system.
Figure 3:
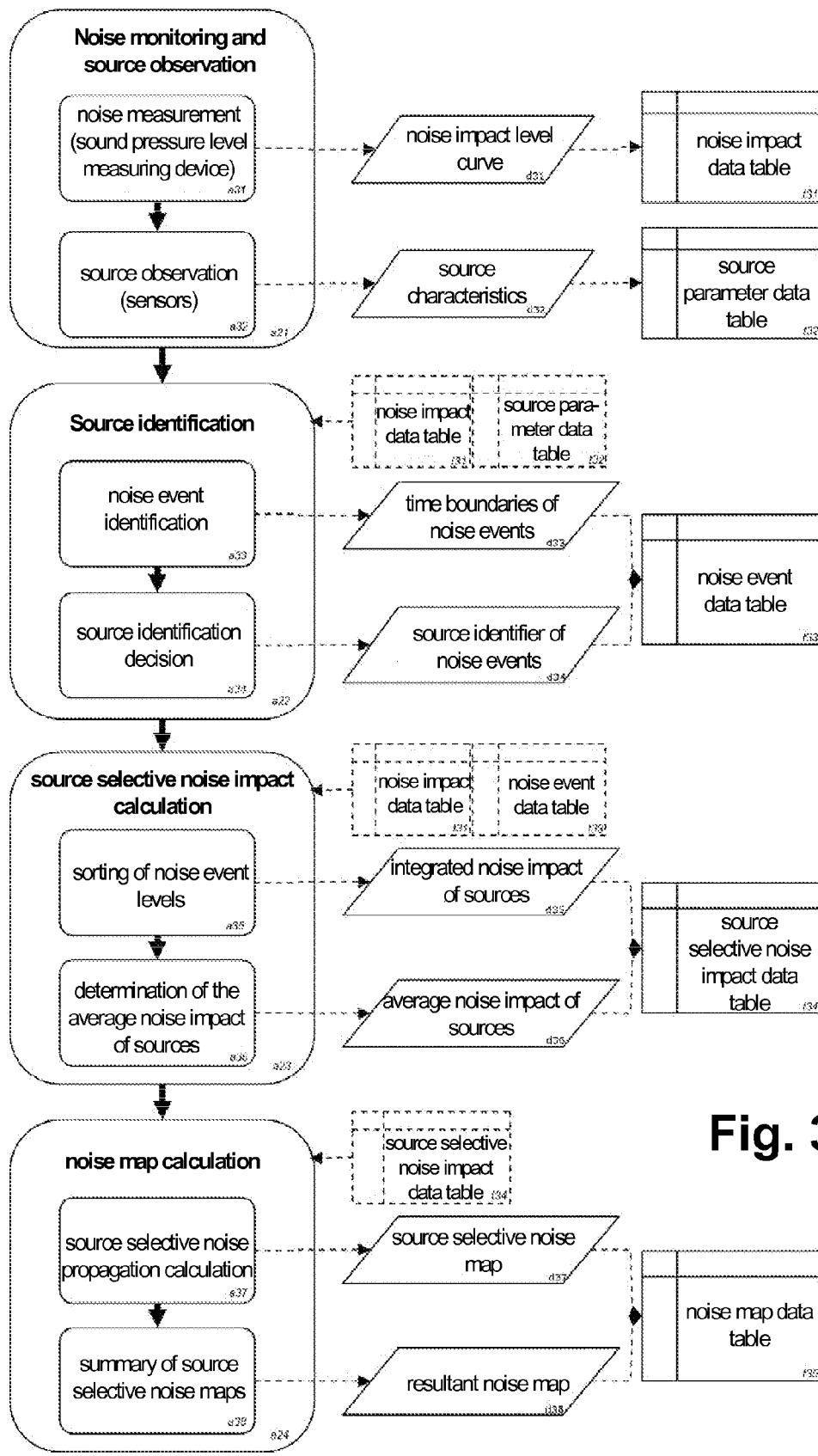
FIG. 3 shows a possible flow chart of the process of the execution of an automatic measurement cycle.
Figure 4:
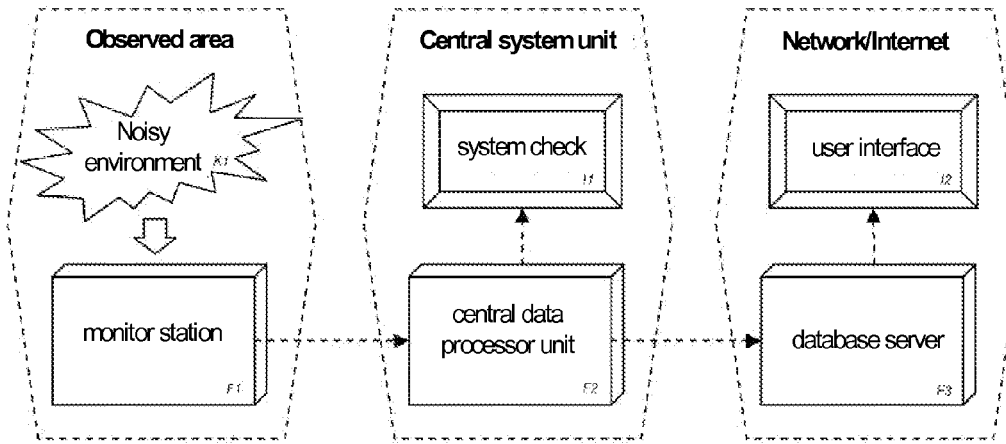
FIG. 4 shows the structure of a possible implementation of the system suitable for the execution of the method according to the invention at block diagram level.
Figure 5:
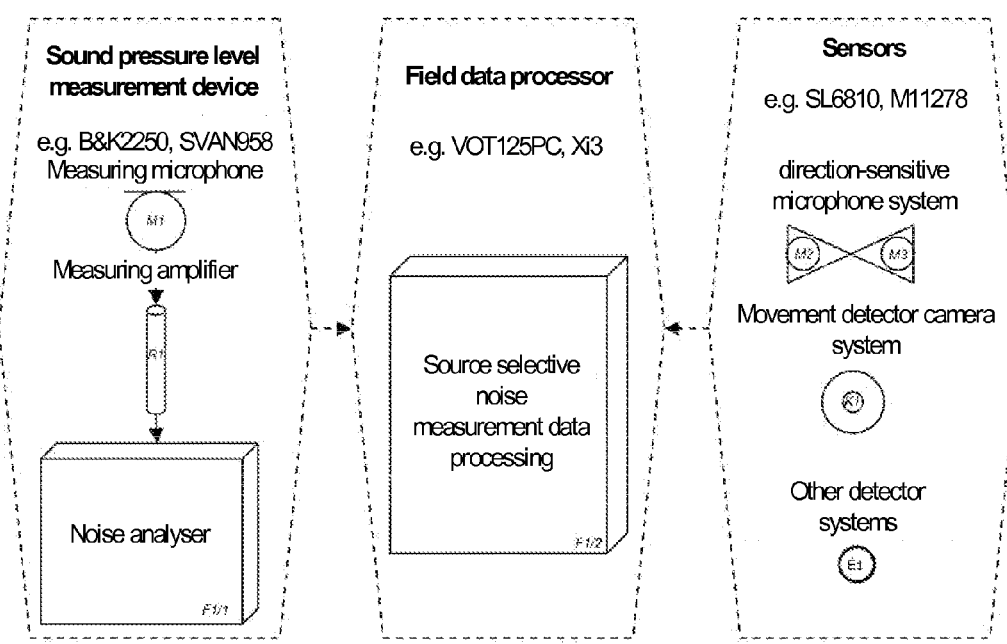
FIG. 5 shows the structure of a possible implementation of a monitoring station within the system according to FIG. 4 at block diagram level.
Figure 6:
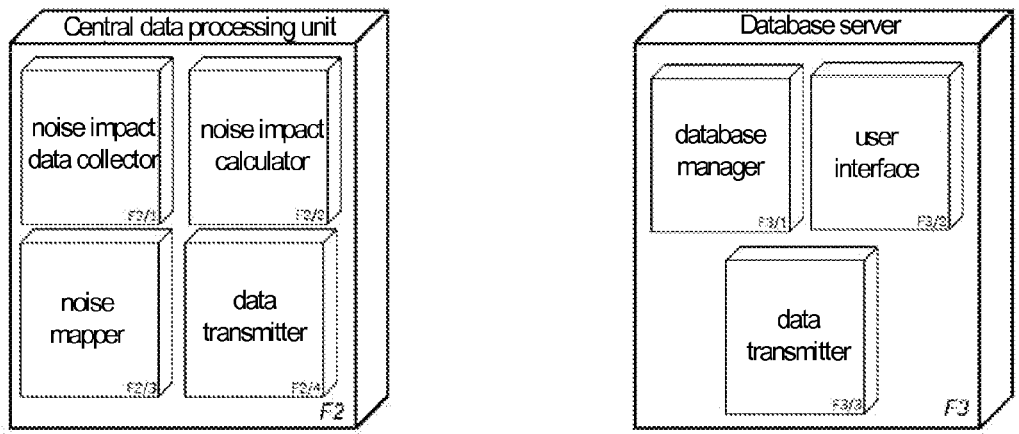
FIG. 6 shows a possible implementation of a central data processing system and a database server arrangement.
Figure 7:
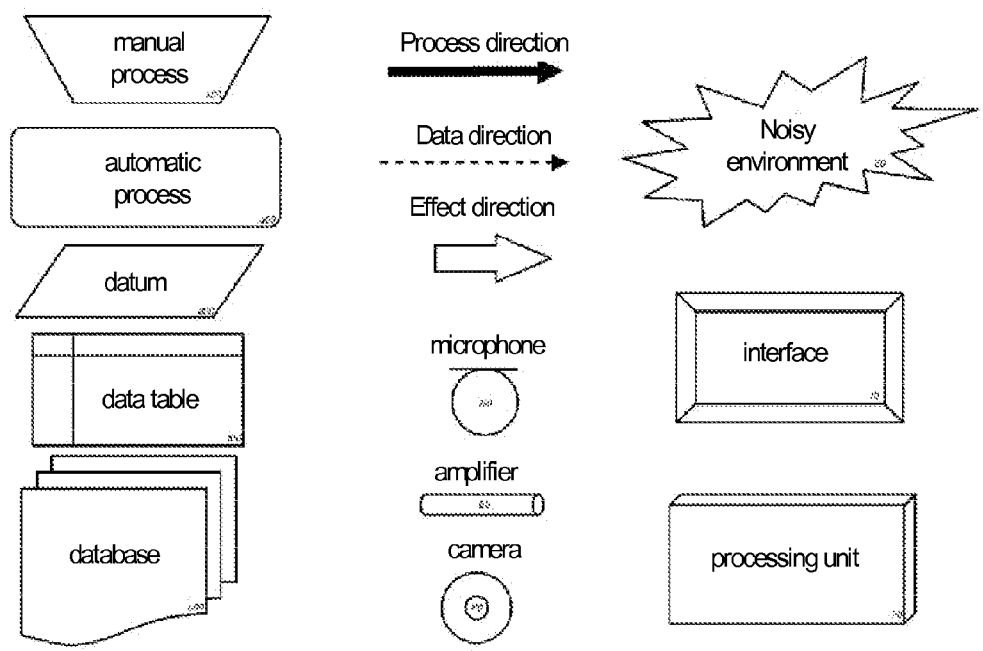
FIG. 7 shows the legend of the marking used in the drawings.

The objective of applying the invention is to collect data on environmental noise prevailing in a given area, executed through measurement and the processing of the measurement data. Take for instance an area where the environmental noise impact is produced as the summary of the impacts of several noise sources. The sources may differ from one another spatially and also in their nature and, moreover, their operation changes unpredictably, so the noise impact ever depends on the current state ever of the respective sources. Thus we may assume road and railroad sources, or an industrial source or construction site may be given which also produces significant noise in the area. Although there are methods for assessing the noise impact of a road, railroad or even an industrial/construction site, these methods have the drawback that their estimates are inaccurate and acceptable only in case of long-term averaging. It is also possible to do such indicative noise measurement sampling which enables the approximate determination of the average noise impact of the noise sources, but the accuracy of the data is acceptable outside the measurement period in this case also only with some reservations.

The objective of the application of the invention is to keep the noise impact of the area under continuous control without human interference. That is, beyond the installation and regular inspection of the system, measurement, data processing and publication are all done automatically. Furthermore, the system is capable of the simultaneous selective monitoring of several sources, that is, it can determine not only the resultant noise impact, but also the noise impacts of the respective sources. Moreover, data collection does not only refer to the measurement point, but the noise impact can be defined for every point of the area with its help. That is, there is an area impacted by several sources, of which we want to produce a continuously updated real-time noise impact map with the help of the invention.

For the purpose of the installation, an expert skilled in environmental noise protection is needed, since the determination of sources d11, the designation of measurement point d13 and the initialisation of system k21-k22-k23-k24 requires professional expertise, and the accuracy of data b21 provided by the system depends to a significant extent on the work of the installation person(nel). During installation, the following steps need to be executed:

The first step is the survey of area k11, during which sources d11 exerting an effect of a perceivable measure on the noise impact at specific points of the area are to be determined. Sources d11 can be grouped (lanes of a public road, machines of a construction site), in which case they will figure together in separation a23 executed later.

The second task is the determination of the noise propagation conditions of said area. It is commendable to have recourse to noise modelling application k12 for that purpose. The goal is to determine for each source difference in noise impacts d12 between the specific points of the area, that is, noise impact d31 of Road No 1 is higher by X dB in Point A than in Point B, whereas noise impact d31 of Railroad No 1 is higher by X dB in Point B than in Point A. Later on, data collected in the measurement point can be extended into a noise impact map by using these noise impact difference values.

Once sources d11 and noise propagation conditions d12 are known, measurement point(s) d13 where monitoring stations F1 will be installed shall be designated. Measurement points d13 shall be defined so that each of the previously determined sources d11 should cause significant noise impact d31 in at least one measurement point d13.

The designation of measurement points d13 can be followed by the assembly of monitoring stations F1. Every monitoring station F1 should be equipped with a calibrated sound pressure level (SPL) measurement device; a computer unit F12 capable of pre-processing the data and a communication unit F12 capable of transmitting the data. Furthermore, all stations F1 together should possess a sufficient number of sensors (which may be acoustic M2-M3, visual K1, signalling or other sensors É1) to provide sufficient data for the identification of the dominant periods d34 of the respective sources d11, that is, the source d11 contributing in a dominant way to resultant noise impact d31 should be known at every moment of time. For a road, dominant operation means the passage of a high number of cars at once; for a railroad, it is dominant during the passage of a train, and for a construction site it may be dominant during the generation of a significant noise event d33, say the operation of a machine. These can be identified typically based on their spatial location with a direction-sensitive microphone system M2-M3, based on their frequency or time characteristics, or by visual signals, but the relevant options are practically unlimited.

After installation k21 of monitoring station(s) F1, a data processing centre F2 shall be established which is capable of collecting data from monitoring station(s) F1 and of processing them.

First part a21 of this process a11 is the determination of the resultant noise impact d31 in the specific measurement points, meaning in practice the summary of the data of the sound pressure level measuring device(s).

Second part a22 is the determination of the dominant sources d34 which are dominant at the respective moments of time, based on the data of sensors M2-M3-K1-É1 installed at the station(s), through a partly pre-programmed, partly learning algorithm capable of inferring from the individual parameter combinations t32 the dominance of the sources by placing all the data of sensors M2-M3-K1-É1 in a single parameter space and of taking decision a34. For example, if camera K1 directed at the railroad source to the left of station F1 provides no picture, but the direction-sensitive microphone system M2-M3 detects the noise from the left side, then probably a major part of resultant noise impact d31 will be attributable to the road source also on the left, and not the other road located on the right side, or the construction site located also to the right.

Third part a23 of the processing determines for a longer period average noise impact d36 for the respective sources in a selective way on the basis of resultant noise impact d31 known for the respective moments and source dominance d34 which is also known. Symbolically speaking, this takes place so that if at the $N^{th}$ moment noise impact d31 was X dB, attributable according to the decision of algorithm a34 mainly to Road No 1, then this X dB in put into the summing unit of Road No 1. Subsequently, impact d31 of Y dB measured at the $N+1^{st}$ moment is put into the summing unit of source a35 dominant at the given moment. At the end of the period, the summing units are aggregated and the system distributes the sum d35 over the entire time section, and hence average impact d36 is provided (of course, all that takes place according to the dB logarithm calculation rules). Thus the specific average noise impact d36 of each source is known for every period.

Last step a24 is the extension of the measurement into noise impact map d38. Since noise impact d36 of each source d11 prevailing in the measurement points is known for every period, and during installation, noise impact difference d12 between the respective points of the area was determined for every source, noise impact 36 of every source a11 valid in every period can be calculated a37 at every point of the area. Subsequently, the noise impact map valid in the respective periods can be compiled by aggregating these impacts d37 in every point, every period, for all sources, and by color-coding resultant noise impact levels d38.

In the final phase of the installation, the teaching of decision-making system k22 shall be carried out, so that, according to one option, the expert uploads the identifier of the momentarily dominant noise source d34 manually simultaneously with measurement a11, and the system matches the sample series so received with the data of sensors M2-M3-K1-É1 and creates and fine-tunes, respectively, decision-making rule system a22. Practically, the testing of the entire system F1-F2-F3 is also part of this phase.

If the installation has been accomplished appropriately, the system will keep measuring noise impact d31 at measurement points d13, and it will observe with its sensors M2-M3-K1-É1 the respective sources d11. Central system F2 determines on the basis of the collected data t31-t32 the periodic noise impact d36 of the individual sources d11, and calculates noise impact map d38. Map d38 is updated in real time, once in every period, and it stores the previous data b21, so it is possible to view the cycles of entire days in retrospect and to make statistical analyses. It is possible to display in map d38 the resultant noise impact, the specific noise impact d37 of the respective sources, and also the noise impact caused by certain source combinations.

There are many options for using the data being produced this way. The user may be interested in the contribution of a given source d11 to resultant noise impact d31, e.g. noise impact d36 of a construction activity needs to be determined in a noisy environment K1. Or, the user can display resultant noise impact map d38 on the Internet to inform the population. With systems located at the appropriate nodes, it is possible to monitor the traffic noise impact of entire neighbourhoods, and long-term observation may lay the ground for strategic decisions. It is also possible to provide for feedback based on the measurements, hence it is possible to intervene in the operation of noisy activities carried out in the proximity of sensitive impact-bearers if the system signals excessively high noise on one of the even tens of observed facades to be protected.

After the survey of dominant noise sources d11 of the selected K1 site (we regard as dominant any noise source which exerts an influence of merit on noise impact d31 in the area to be mapped), one or several reference points d13 must be chosen from which every noise source d11 can be covered with the help of measuring instrument F1 installed there, that is, there shall be no dominant noise event d33 not detected by the or one of the instruments F1. Instrument F1 located in reference point d13 shall be capable of sampling the resultant noise impact d31 in real time, continuously. Almost any modern sound pressure level measuring, noise analysing or noise monitoring station is suitable for this purpose, which in most cases already register and forward the measurement data themselves or, if necessary, they can be complemented with a computer of adequate design installed on site which will be needed in any case to process the decision-making data and to run the decision-making algorithm.

The decision-making algorithm carrying out breakdown a35 of noise impact level d31 to sources needs time-stamped data t32 on the basis of which it can be determined a34 which sources d11 were dominant in the given period. The data serving that purpose can be produced in a practically infinite number of variants; in what follows, we shall describe a typical combination.

Two or more microphones M2-M3 need to be installed in order to learn the direction of the noise source, if possible, with such direction characteristics as will further improve the direction-selectivity of the system. The signals of the microphones can be digitised with the help of an appropriate audio processing gear, and processed by being connected to a computer F12. Awareness of the sound characteristics may also considerably promote decision-making, so it is worth registering also the frequency and time characteristics that can already be transmitted by most sound measuring devices F11. Useful information can be obtained also by analysing the pictures made of the area, the most important among them being probably motion, but one can also infer to the state of certain noise sources from their visual appearance.

The simplest and cheapest device to record those is a webcam K1 taking pictures at adequate intervals, which are then recorded and processed by computer F12. It is commendable to set the sampling density of the complete system at 1 sec or less. For, the reference time for which source selective noise impact d36 can be established should be several times the sampling time for the sake of adequate accuracy.

There is no general rule for taking decision a34, since that always depends on examined area K1. As for the structure of decision a34, on the other hand, the following solution is recommended. Threshold values need to be assigned to the observations which separate the most likely values typical of the respective sources d11 from one another. One way for defining those is by determining dominant noise sources d34 of the respective periods by human or independent instrumental observation on site, and by then comparing those to reference observations t32 made at the same time (direction-sensitive microphone system M2-M3, frequency and time characteristics, webcam K1 etc.). This way, it is possible to determine for each observation the histogram of the values occurring in case of the dominance of the respective sources d11, and then to draw the boundaries on the basis of which the respective sources d11 can be distinguished. We can produce this way source-typical values from observation values t32, and take final decision a34 based on their weighting and combination within the reference time. Responsibility for the definition of decision-making rule k22 always lies with the expert responsible for the installation of the system.

To determine the noise impact level in each of the grid points of noise map d37 in the actual period of the reference time, the noise propagation conditions must be known. Those conditions can be expressed by the quasi-time-invariant noise propagation d12 factor interpreted by emission-impact point pairs. The factors concerned shall be calculated prior to the commissioning of the system, with the help of a special application written for the modelling of noise propagation k12, and they need to be re-calculated only if noise propagation d12 conditions in the examined area K1 undergo significant change. The approximate values of the noise impact levels originating from the respective emission points in every grid point of noise map d38 in the actual reference time period can be determined on the basis of the noise impact d31 levels originating from the respective sources d11, referring to the reference points d13, with the help of the linear combination of noise propagation d12 factors. Moreover, resultant noise impact d38 can be determined by summary a38 of noise impact d36 values originating from the individual emission points, that is, in the broader sense, from noise sources d11.

The noise map d38 ever typical of the noise impact conditions can be produced by the real-time cyclical re-calculation of the breakdown by source factors d36 of resultant noise impact d31 and the calculation of the effective noise impact in the grid points of noise map d38. To display the real-time noise map, the display methods typical of static noise maps may be used, supplemented with a time axis, that is, noise map d38 is cyclically updated and it can be viewed and subjected to statistical analysis. Several known database management and presentation means are available for that purpose. The display form ever shall be adjusted to the field of application. Furthermore, it is commendable for the display to support switching on and off the respective sources d11 and hence the inclusion of their noise impacts into, or their exclusion from the resultant noise impact. Since summary a38 of noise impact d36 originating from the respective sources d11 is the last, very simple, step of the calculation cycle, it is useful to store (also) noise impact d36 levels by source d11, and to repeat summary a38 in case of the alteration of the range of displayed sources d11.

Several topologies are conceivable for the data processing and data forwarding functions of the system which can be designed most optimally in line with the field of application. If, for example, the recording and analysis of noise measurement t31 and observation t32 data and the running of decision-making algorithm a34 and the calculation of noise impact a37 effective in the grid points of noise map d38 all take place on computer F1/2 located in the "measuring box", then the amount of data to be forwarded to the display function will remain small, but that single device must be given significant computing capacity. According to another topology, only the recording and pre-processing of the measurement data takes place on the on-site "measuring box" F12, then they are forwarded to a central computer F2 where the rest of the computation takes place. This solution is favourable especially if measurements all are carried out in several reference points d13 or if we want to minimise the number and complexity of devices F1 installed on-site. Of course, devices M2-M3-K1-É1 doing the observation do not necessarily have to be linked spatially to noise measurement a11, or may even be part of a system that is fully independent of it, and the data may be summarised only on central computer F2, so the data of the traffic or industrial operation systems or surveillance cameras can also be used for taking decision a34. Thanks to this degree of freedom, the specific design depends exclusively on the assessment of the expert who studies the case thoroughly. The objective, however, is always to reach the highest possible proportion of correct decisions.

In what follows, the factors to be taken into account in regard of the implementation of the proposed method and system will be described.

Considerations Regarding the Areas
Boundary of the Examined Area:

The examined area K1 is the area definable by outlining the points whose noise impact d38 can be determined by the system operating according to the above method and system in real time, in a source selective way. That is, every (reference or virtual) measurement point at which noise impact d38 can be defined within the expected error limit will be within the examined area K1, and every point were noise impact d38 can be determined for any reason with an error, i.e. uncertainty, exceeding the expected error margin will be outside the examined area K1. For example, if the function of the system is to produce the real-time traffic noise map of a neighbourhood, then the examined area K1 will coincide with the mapped area. If the system monitors the impacts of a construction site, the examined area K1 will be the area encircling the buildings in the surroundings of the construction site.

Impact Area of the Sources:

One of the key conditions of the determinability of the impact area of sources d11 is the size of the area where the actual state of noise impact d38 can be estimated (extrapolated) on the basis of noise impact d31 measured and broken down into sources by the monitoring stations F1. That is, the extent of the area under study will depend primarily on the position of the monitoring stations F1 and noise sources d11. The examined area K1 shall not include areas covered in a dominant way by such noise sources d11 the noise impact d31 of which cannot be measured by any of the monitoring stations. Such a dominant source may be a source lying far away from monitoring stations F1, or a section of an extensive line, or part of an area source the actual noise impact d31 of which cannot be defined by measurements made in the area. Practically, the examined area K1 often coincides with the impact area of sources d11 observed by monitoring stations F1 which, however, has several definitions, but in practice it coincides with the area where the operation of the given source d11 is decisive from the point of view of environmental noise impact d38. Typically, the boundary of the impact area may be the distance from source d11 where the effect exerted by the noise impact on human beings decreases to a negligible level (e.g. to a level lower by 10 dB than the noise impact threshold value), or where it meets the impact area of another noise source d11, in which case the impact areas may partly overlap, but they will end where the noise impact of the adjacent source d11 becomes much stronger than that of the monitored noise source d11. If the system monitors noise impact d36 of a railroad line while that is being crossed at certain points by roads, and noise impact d36 of those roads is not measured by any station F1 then, albeit we may be aware of noise impact d36 of the railroad line even from a distance of several kilometres (provided that the speed and frequency of the trains do not change on that section), noise impact d38 at the road crossings will be unknown, since noise impact d37 of the roads cannot be defined at any point (they fall lie outside the scope of monitoring stations F1), so they will appear as "virgin areas" if a noise map d38 is made of the data.

Reference Measurement Points:

The examined area K1 is influenced most by choice k13 of reference measurement points d13, since the examined area K1 coincides with the union of the impact areas of the noise sources d11 which lie within the scope of monitoring stations F1. The planning predictability of examined area K1 will be best if we define for the respective monitoring stations F1 their respective examined areas, and later on we define the total area covered by the individual examined areas by treating monitoring stations F1 as a network.

Consider a monitoring station F1 positioned at the "intersection point" of five noise sources d11: a motorway, an urban main road, an access road, a railroad and a construction site. Monitoring station F1 is capable of determining the source selective noise impacts d36 of all five noise sources d11, and it will also filter out the non-relevant noises. After processing a22-a23-a24 of the measured data, noise impact d38 can be determined in the impact areas of all five noise sources d11 and also within their cuts. Traffic on the motorway is relatively even along approximately 5 km between the two nearest exist ways, hence noise impact d38 can be determined quite well along this 5 km section, in a broad band, except for a few points where it crosses roads of a lower order which nevertheless cause a significant noise impact in a small area. Traffic is modified beyond the motorway exit lanes, and noise impact d38 there is difficult to infer from the measured d31-d32 data. There is quite significant traffic on the urban main road, so it causes significant noise effects also at a great distance from the axis of the road, that is, it has a broad impact area, similarly to the motorway. Traffic along the main road is, however, "interrupted" by crossings with traffic lights which are not very distant from one another, so noise impact d37 of this band can be defined only in a length of 1.5 km. The access road has no serious traffic, but its local significance is high, and if we want to make a noise map d38 of the area, and we can determine the impact of noise d36, then it is possible to avoid thereby that the noise map d38 be crossed by a white band. The noise impact of the railroad is discontinuous, that is, in a significant part of the time it causes no noise impact at all, then at the time of train passages it causes a significant noise impact d37 over an enormous area, and this is why it is important that the railroad should also be subjected to selective measurement.

Considerations Regarding the Sources
Examined Source:

Examined source d11 is one that causes significant noise impact d31 in at least one monitoring point d13. This is an essential condition since what cannot be measured (heard) cannot be studied either. Of course, the inverse is equally true: if we want to examine a source d11, we have to position k13 monitoring points d13 so that they should be measurable in at least one.

From the point of view of the system, a source will qualify as unit examined source d11 if it can be substituted by a noise emission point, line or area source having, in the calculation of environmental noise impact d38, a specific and time-invariant spatial extension and direction characteristic, changing in time, but uniform in regard of source d11. That may be part of a real object or a group composed of several real objects.

For a public road, a unit source d11 is the section where the density and speed of the vehicles shows no change of merit, that is, the noise emission is constant. A multi-lane road can be regarded as unit source if traffic is distributed evenly in the lanes, but it can also be regarded as several separate sources if that is warranted to ensure the accuracy of the determination of noise impact d38. A construction site can be regarded as a single area source, if its noise impact d37 is examined from a greater distance relative to its area, and hence all activities taking place there are regarded as being distributed evenly spatially, but if the construction site is, say, the renovation of an urban public area surrounded by buildings from every direction, then it is far from indifferent in which part of the area a front-end loader, an air hammer or a tower crane will work, hence the construction site cannot be regarded as unit source d11, but every significant machine must be measured and modelled as a separate source d11 instead.

Source Distribution

Thus the definition of the range of the examined sources d11 can be approached from two aspects, one being the sources d11 which can be distinguished by monitoring station F1, and the other the sources d11 modelled by noise propagation model k12. These two aspects work against each another, since the fewer sources d11 monitoring station F1 must distinguish a34 from one another, the more accurately (with the less error) it can determine noise impacts d36, whereas from the point of view of noise propagation model k12, the more sources d11 are modelled, the more accurate computational result d37 will be. To remain with the previous example, if in the renovation of the urban place the entire construction site would be treated as a single source d11, then monitoring station F1 would only have to filter out the non-relevant noises, but it would cause significant inaccuracy in computation a37 that sources closer to monitoring station F1 would cause disproportionately higher territorial emission than sources farther away from station F1, but with a noise emission similar to the previous ones. Consequently, the task is to define the source breakdown causing the least error in the ultimate results, which is an optimisation task to be performed during system planning.

Considerations Regarding the Noise Impact
Interpretation of Noise Impact:

By noise impact d31 the equivalent sound pressure level measurable during a given period is meant. Noise impact d31 can be interpreted with filters with different frequency and time characteristics; that exerts no significant influence on noise propagation calculations a37, but it is important to take into account identical filters for the measurement and the calculation or to make the appropriate conversions. That is, if the equivalent sound pressure level measurements are made with a frequency filter with characteristic "A" and a rapid temporal filter (marking: L.A, F, eq), then the sound pressure level L.A, F, eq shall be interpreted as noise impact d31 throughout source separation a23, propagation calculation a24 and the noise map calculation, unless filter conversion is effected during the process (which, however, may lead to quality deterioration).

Sources of the Noise Impact:

Noise impact d31 can be interpreted for various source combinations. With sound pressure level measurement, we can define the combined, cumulative impact at the measurement point of all noise sources active in the area. If the noise emission of the respective noise sources is known, it is possible to determine by propagation calculation a37 the respective noise impacts of the sources and, with logarithmic summary a38, the cumulative noise impact d38 of source combinations. This makes it possible to filter out the irrelevant noise sources from the examination, and to determine the noise impact also for various source groups. For example, if the noise of a road and a railroad and the noise of an industrial plant and household noises are present concurrently in an area, it is possible to determine cumulative noise impact d38 corresponding to the measurable sound pressure level, but with the source selection method, it is possible to filter out from it the household noise which is irrelevant for the examination, and to define separately the traffic and the plant noise impacts d37, respectively, which may be necessary for comparisons with the limit values.

Spatial and Temporal Distribution of the Noise Impact:

The spatial distribution of noise impact d38 depends on such parameters, quasi time-invariant in relationship to the measurement point pairs, as the distance, the terrain conditions and the location of features hindering noise propagation. Whereas the temporal distribution of noise impact d38 depends exclusively on the intensity of the respective noise sources, and hence the relative time function interpreted by source is practically independent of the position of measurement point d13. That is, for example, the specific noise impact d37 of a road will change at every point together with the traffic changes, and the differences in the absolute noise impact d37 levels prevailing at the points will be determined by the noise propagation difference d12 which is identical at every moment.

Considerations Regarding the Separation of Noise Events
Dominant Noise Event:

To break down noise impact d31 into source components d36 in a multiple source environment K1, we make use of the phenomenon, present in the majority of cases occurring in practice, that if a short time-section is examined, noise impact d31 can be linked to a single dominant d34 source which suppresses the noise impact of the other sources d11, that is, irrespective of the intensity of the other sources d11, cumulative noise impact d31 is approximately identical with the noise impact of dominant source d36. These relatively short periods are called noise events d33, and the noise impact time integrals which prevail over them are called noise event levels. For example, in an area comprising road, railway and plant sources, at the time when a train passes by, the noise impact of the other noise sources is hardly perceivable, that is, over that period, it cannot be ascertained whether there is any traffic on the road or whether the plant is active. From the moment when noise impact d36 of the train becomes dominant until an even more intensive source d11 intervenes or passes by, it may be regarded as a single noise event d33.

Division of Noise Events:

Several noise events d33 associated with various sources d11 take place over a longer period. If noise events d33 are registered so that the respective noise event levels are put in summing unit d35 maintained for source d34 associated with them, by the end of the period, the noise event level summaries collected in summing units d35 provide a picture of some sort of the intensity of sources d11 over the period concerned. By re-dividing the respective noise event level aggregates d35 by the length of the period, we get the approximate values of noise impacts d36 of the respective sources.

Let's take, for example, a ten-minute period during which two half-a-minute train passages take place and on the road one-minute heavy traffic periods are followed by one-minute breaks, while the plant produces an even mediocre noise impact d36. The train passages are noise events d33 which are substantially more intensive than the other sources d11, but projected to a ten-minute period, they produce a relatively low noise impact d36. The road generates intensive noise events d33 in half of the period and hence it results in a very high noise impact d36. Noise impact d36 of the evenly operating plant is somewhat lower than that, but higher than that of the railway.

Secondary Noise Events:

However, this method does not include the "secondary" noise events caused in the non-dominant period in summary d35, so for non-dominant sources d11, it counts with zero emission, which is a wrong approach in most cases. To eliminate this error, it is commendable to use interpolation which attempts to fill the missing time sections for the suppressed sources d11 with a pattern typical of the given source d11. To stick to the previous example, the continuously operating plant source is not dominant in the second half of the period, so without interpolation a 3 dB error would be produced upon the determination of the plant noise impact, but that can be eliminated by simple linear interpolation. As for the road source, a more complex interpolation is needed to eliminate the error that would otherwise be lower than 1 dB; that has to assess whether there was or wasn't any traffic on the road during the passage of the train, and add the corresponding half-minute noise event levels to summing unit d35 of the road.

Considerations Regarding Noise Propagation

Noise Impact Level Difference:

Noise propagation d12 is the process taking place between source d11 of the noise and the point of the determination of noise impact d37, which results in regard of the equivalent noise impact in the decrease of the impact level. Hence the value characterising noise propagation d12 is the extent of the decrease of the noise impact level. Although the starting point of noise propagation is always the position of source d11, the noise impact level cannot be interpreted in that point, since its distance from source d11 is zero, so if the value of noise propagation d12 is derived from source d11, then it is expressed as the difference between the noise performance level of the source (marked Lw) and the noise impact of the measurement point. In many cases, however, it is more expedient to express the value of noise propagation d12 by the difference of the noise impact levels of two measurement points d37. Most often, this means the difference in the noise impacts of a point in the very close proximity of source d11, where the impact of no other source can assert itself, and of a farther measurement point d37. However, as it is feasible to execute source separation a23 of noise impact d31, it is not necessarily imperative to have the first point near the source, as selective noise impact d36 can be determined also farther away, in the scope of impact of other sources d11, so it is possible to determine noise propagation value d12 referring to the respective sources between any point pairs of the area, which is produced as the difference of the noise impact levels d37 generated by the source. Although we depart to some extent from the definition of noise propagation according to which its direction always points from the source to the impact point, the noise propagation difference can be interpreted and used well in the area around sources d11.

That is, take a source d11, for the sake of simplicity a point source, which causes decreasing noise impact d37 in its impact area with the growth of the distance. Let's consider a hypothetical arrangement comprising a source d11, an emission point close to the source and two measurement points d13, and let's take the noise performance value of source d11, which is, say, 110 dB; then the noise emission measurable in the emission point near source d11 is 100 dB (identical in nature with noise impact level d31), and noise impact level d31 in the first measuring point d13 is 80 dB (if the distance is given), whereas in a second measurement point d13 lying farther away, the corresponding value is 70 dB. Relative to the noise performance of source d11, the value of noise propagation d12 between source d11 and Point 1 is −30 dB, and between the source and Point 2 it is −40 dB. Relative to the emission point, the corresponding values are −20 dB and −30 dB, respectively, whereas the value (difference) of noise propagation d12 between the first and second measurement points d13 is −10 dB.

Noise Propagation Calculations:

Several standard methods have been developed already for the calculation of noise propagation k12, of which the method matching the purpose and the circumstances ought to be chosen. It is common in every method that the spatial relationship of source d11 and of the measurement point(s) is to be taken into account in every case. Noise propagation k12 is significantly influenced by the distance measured from source d11, the terrain, the soil type of the intermediate area and the field objects in the way of the sound. Furthermore, many other factors may also influence the propagation of sound, which can be taken into consideration or disregarded, as the case may be, depending on the targeted degree of accuracy. For the purpose of the present application, however, the conditions of noise propagation d12 shall be regarded as being essentially static, time-invariant, which does not mean that noise propagation values d12 cannot be modified from time to time, but that time interval should be much bigger than the cycle time of noise monitoring a22, of source separation a22-a23 and of the calculation of noise map a24, for the calculation of noise propagation values d12 is a much more time-intensive process than the previous ones. Hence the positions of source d11 and of the measurement points, of the terrain and the field objects must be essentially static or, if they do change, then they should be replaced by an average state.

That is, a passing train cannot be a source d11; instead, source d11 is represented by the railway line, similarly to utility work machines moving about on a construction site, where source d11 can only be the static construction site, not the moving point sources. That is, in area K1 comprising road, railway and plant sources, the respective sources d11 can be replaced by static point, line and area sources, and then the parameters influencing propagation (distance, terrain, soil, field objects) must be defined for every source d11-measurement point pair one by one, and the noise propagation value is to be calculated. For example, if the least distance between a given measurement point and the railway line is 30 m, and there is a wide ditch covered with grass and a wooden fence in between, in possession of these pieces of information and by proceeding according to the standard procedure we can determine the noise propagation value, and hence if the noise performance level is known, the noise impact d38 of the point can be calculated.

Redundancy of Recurrent Calculations

It is not necessary to repeat the standard calculation-intensive-determination of noise propagation value d12 upon the calculation of noise impact d37, since that can be, calculated directly from the actual level of the noise performance of source d11. That is, if noise propagation value d12 is known, there is no need to know the factors influencing noise propagation d12. The value of noise propagation d12 always applies to a source d11 measurement point pair, that is, the number of all noise propagation values d12 is identical with the product of the number of the sources and that of the measurement points. If the measurement points are drawn by source d11 on the surface map, by indicating the noise propagation values d12 by the heights of the respective points, then we get a relative noise impact map corresponding to the number of sources d11 where the real value of the noise impact is unknown in the absence of the noise performance values of the source, but the impact differences between the individual measurement points can be assessed quite well. If the level of the noise performance of a source d11 is provided for the map, then we get absolute impact d37 of the measurement points (the absolute height of the points), and while the noise performance level changes, the noise impact differences of measurement points d37 remain unchanged, that is, the total surface moves up and down together. Since noise impact differences d12 are unchanged by source d11, it is not absolutely necessary to know the noise performance level of a source d11 for the determination of the noise impact d37 of the points; it is sufficient to know the noise impact level in no more than a single measurement point, and the impacts of all the other points can be calculated from that.

That is, take a road, a railroad and a plant area. First we substitute those by sources d11, which indicate two line sources and one area source. Then we cover the area by a 100×100 point grid; these will be the measurement points where we want to define the noise impact values. First we determine noise propagation conditions d12 by source d11, which draw parallel contour lines for the line sources with the growth of the distance, and quasi-concentric polygons for the area source. Moreover, in line with the terrain conditions and the field objects, shading may evolve in some areas. Hence three maps are produced for the three sources d11, with 10'000 points by map and a total of 30'000 noise propagation values d12. From these it is possible to determine at any time the relative noise propagation value by source d11 of the 10'000×10'000 measurement point pairs (altogether 300'000'000 noise propagation differences). If the noise performance level of the three sources or their noise impact d37 caused in any of the 10'000 points is known, it is possible to calculate in every point noise impact d37 by source d11.

Considerations Regarding Noise Modelling
Noise Modelling Applications:

Noise modelling k12 is the software implementation of the standardised methods developed for the calculation of noise propagation d12. The software comprises three basic parts, i.e. the input interface, the calculation algorithm and the result presentation interface. Graphical and numerical data can be loaded on the input interface, to determine thereby the position and noise performance level of sources d11, the position of the measurement points, the terrain, the soil type, the field objects and further factors influencing noise propagation d12. For calculation k12, the algorithm breaks the bigger sources into segments, and defines the values decreasing noise impact d37 (distance, terrain, soil, objects) by source d11 for all measurement points and, finally, it determines noise impact d37 in the measurement points, which it aggregates for all sources d11. The results can be displayed numerically and also on colour map. For example, for an area K1 where there is a road, a railroad and a plant area, first the tracks of the road and the railroad must be drawn, and the plant area must be outlined, then the noise performance level of source d11 must be assigned to the objects so construed. Subsequently, measurement points are to be designated or a grid to cover area K1 must be defined. After issuing the calculation command, the software calculates noise impact levels d38 in every point and draws them on the colour map or lists them, but upon request detailed calculations can also be displayed, such as the components of noise impact d38 originating from the respective sources or of noise propagation value d12.

Source Selective Noise Propagation Calculation

To determine a high number of noise propagation values d12 in practice, it is useful to create model k12 model so that it should comprise every source d11 and every measurement point, but the noise performance levels should be reference values only. Then calculation k12 shall be made separately for every source (source group) d11 so that the noise performance level of the given source (group) d11 is set at an adequately high reference level, whereas the noise performance level of the other source (group) d11 is switched off, that is, its noise performance level is set at zero. The noise performance level reference values shall be subtracted from the noise impact levels in the maps so produced, and hence we get immediately the noise propagation values. To continue with the previous example, this time we do not make the noise impact calculation with the statistical noise performance levels but, by setting first the railroad noise performance level at 110 dB and assigning −99 dB to the other sources (the approximation of absolute zero in the application), we calculate the noise impact in every measurement point (grid point), and then from the noise impact levels we get this way we subtract the 110 dB which results in a negative figure, the noise propagation value d12, in every measurement point. This process is repeated also for the road and the plant source to obtain the three noise propagation maps.

Noise Propagation Database

The method has the advantage that, while the data file of a noise propagation model d12 may consist of thousands or millions of parameters and the calculation time may be hours (or perhaps even days), with the help of noise propagation maps, all that can be stored by a negative figure corresponding to the product of the number of sources and of measurement points, and it makes extremely fast noise impact calculation k12 feasible (requiring a single addition by source-measurement point pairs).

In practice, noise propagation values are worth storing up to one digit, since no calculation that is more accurate than that is needed. With three sources and a 100×100 point grid, after the calculation of the noise propagation values, we have to store a total of 30'000 pcs of figures between 0.0 and −99.9 (no greater damping needs to be stored) and then, at the time of the noise impact calculation, the actual noise performance level must be added to a total of 10'000 measurement points, that is 30'000 additions must be made by cycle, which takes very little time indeed for a contemporary computing unit. Neither will the calculation demand increase significantly if instead of the noise performance level, the calculation is based on noise impact d37 of one point, for the noise performance level of source d11 and then noise impact level d37 can be calculated in one step from noise impact d37, or if the position of reference measurement point d37 is known per se, then noise propagation values d37 must be determined at once relative to this point d13, in which case propagation differences d12 can have positive as well as negative values.

Considerations Regarding the Monitoring Stations

Function of the Monitoring Stations:

Monitoring station(s) F1 is (are) responsible for the determination of selective noise impact d36 of sources d11 relevant for the examination, which will be used in the context of later calculations as reference noise impacts for the calculation of noise impacts d38 prevailing at the other points of the area. A monitoring station F or the group of monitoring stations F1 must be capable of the real-time calibrated monitoring a31 of resultant noise impact d31 prevailing at measurement point(s) d13, and on the basis of source characteristics d32 supplied by the sensors M2-M3-K1-É1 connected to the station, it must be capable of separating a22-a23 noise impacts d36 of the respective sources.

To take a simple case: let's monitor in real time noise impact d38 of buildings in the environment of a road/railroad crossing while there are renovation works going on along one track of the railway line. Given the high number of the buildings subjected to observation and the high number of sources d11, instead of assigning separate monitoring stations F1 to each and every building, we apply source selective monitoring a11 and noise mapping. We choose a reference measurement point d13 near the crossing, where we install a monitoring station F1, which is prepared so as to be capable of distinguishing a22 noise events originating from the road, the railroad, the construction site or other sources, respectively, by its sensors M2-M3-K1-É1. We calculate in advance the noise propagation conditions d12 prevailing in the area with the help of noise propagation model k12, and we store the noise propagation value d12 referring to the respective sources d11 building pairs and the source d11 reference measurement point d13 pairs. Monitoring station F1 supplies real-time data on selective noise impact d36 caused by individual sources d11 in reference measurement points d13, from which we can define by simple calculation noise impact d38 of the observed buildings. Hence with the help of selective noise monitoring we cannot only determine the noise impact d38 of every observed building by a single measurement point d13, but we can also determine separately their construction noise impacts d37 and traffic noise impacts d37, respectively, while filtering out noise d37 of the non-relevant sources from the measurement. This way, the results can be compared unambiguously to the noise protection limit values specified for construction sites and for traffic lines, respectively.

Structure of the Monitoring Station:

The most important component of monitoring stations F1 is a calibrated sound pressure level measurement device M1-R1-F11 providing noise impact d31 data by continuous sampling. For the purpose of storing the data, a temporary storage F1/2 and for their forwarding a data communication unit F1/2 unit are needed. Furthermore, for the separation a22-a23 of noise impacts d31 of several sources d11, sensors M2-M3-K1-É1 and data processing unit F1/2 responsible for source separation a22-a23 are needed. The measurement process takes place so that the data of sound pressure level measurement device M1-R1-F1/1 and sensor M2-M3-K1-É1 go to temporary storage unit F1/2, where a source selection algorithm a22-a23 delimits the noise events and determines their source, and then divides cumulative noise impact d31 accordingly into source selective noise impact components d36 which it also puts into temporary storage unit F12. After that, the data are transmitted to central computer unit F2 where further data processing takes place, including e.g. noise propagation calculation a24.

In many cases, monitoring station F1 comprises a special PC which provides for all data storage and communication functions. Sound pressure level measuring device M1-R1-F1/1 and sensors M2-M3-K1-É1 must be connected to that PC. To return to the previous example, if we want to distinguish the noise impacts d36 of road, railroad and construction sources d11, respectively, it is commendable to position monitoring station F1 so that the respective sources d11 be located in different directions relative to it. Thus if stereo microphone system M2-M3 is connected to the monitoring station (e.g. 2 cardioid type microphones+sound card), then there is a good chance to determine the source of noise d11 by determining the direction of the sound. Moreover, it may be expedient to observe the passages of trains separately, e.g. by a webcam K1 connected to a motion sensor image processing software or even pressure sensor É1 placed on the railway track. Since most sound pressure level measuring devices F1/1 are capable of the determination of the octave or 1/3 octave band frequency breakdown of the noise, we can obtain further valuable information without further sensors, for the frequency curves of road and railroad sources d11 may differ significantly, not to mention the various machines active on the construction site. That is, if sound pressure level measuring device F1/1 detects an intensive noise event d33 the direction of which points towards the railroad and, moreover, the image analysis of webcam K1 indicates movement from the direction of the railroad and the frequency cycle also falls within the range typical of railroad sources d11, we can be sure that noise event d33 can be attributed to the railroad, and the noise event level being measured must be assigned to summing unit d35 provided for the railroad source.

Monitoring Systems:

Monitoring stations F1 can also be operated in a system, extending thereby the size of the covered area K1 and enhancing measurement accuracy. Where stations F1 are interconnected, data d32 provided by sensors M2-M3-K1-É1 of the individual stations F1 can be used also by the other stations F1 in the course of source selection a22-a23, and after the simultaneous determination of selective noise impacts d36 on several stations, it is possible to compare the results, ensuring thereby the adequacy of the measurement results. That is, if we would like to extend area K1 in the previous example also to farther parts of the road and the railroad and to involve more remote sources d11, it is commendable to designate one or several other reference measurement points d13 and to connect the stations F1 installed there into a network. Hence, for example, the passage of a train can be identified with multiple accuracy or if the noise impact of a source d11 can be measured at several stations F1, the values can be compared after the appropriate noise propagation calculation a37 and in case of significant deviation, the results can be reviewed.

Considerations Concerning the Time Periods

The Real-Time Aspect

Since the purpose of the real-time method is the cyclical determination of noise impact d31 effective in the points of a given area K1 based on measurement, the length of the cycle times and delays applied during measurement all and the calculation are decisive parameters from the point of view of the operation of the system. For the supply of information to be regarded as being in real-time, both the map updating cycle time and the delay between noise event (series) d33 and the updating of the map shall be kept below a certain limit. This limit strongly depends on the application area, primarily the cycle time of the fluctuation of the examined noise impact d31. The reduction of the cycle time and the delay time, however, is limited partly by the speed of data processing and forwarding, and partly by the time needed for the collection of the quantity of data necessary for adequate accuracy. For example, if the objective is the examination of the daily cycle of noise impact d38 caused by a traffic node, noise map d38 ought to be updated at least every hour. If, however, trains pass every 5-10 minutes, then it is commendable to set the updating time at less than 10-20 minutes, because this way the successive states may be significantly different depending on whether there were 2, 3 or maybe 4 train passages during the update, and that would result in misleading information concerning the daily cycle.

Cycle Times:

However, several processes must take place between two updates, and their cycle time has a fundamental influence on update time. The smallest unit is the sampling time of sound pressure level measuring devices M1-R1-F11 and sensors M2-M3-K1-É1, which should be much shorter than the length of noise events d33 typical of sources d11 to make it possible to delimit noise events d33 with adequate accuracy a33 and to be able to collect a sufficient quantity of data d32 about them. Since minimum sampling time is typically the fixed parameter of the devices being applied, this sets also a shortest noise event d33 time length which can be taken into account, since it is feasible only to delimit and identify events d33 exceeding a certain period of time. To make it possible to divide cumulative noise impact d31 accurately into selective noise impact components d36, a high number of noise events d33 need to be delimited a33 and identified a34, and hence the updating cycle time must be significantly longer than that of noise events d33 (of course, extremely long noise events may be divided into several successive noise events).

Let's take a traffic node where a road and a railroad source d11 are active. If the minimum sampling time of sound pressure level measuring devices M1-R1-F1/1 operating on monitoring station F1 and the attached sensors M2-M3-K1-É1 is 1 s, then noise events d33 can be delimited with maximum 1 second accuracy, that is, a noise event d33 of a few seconds—the passage of a motorcar—cannot be treated as separate noise event d33; instead, the passage of vehicle groups coming in discontinuously or the passage of a train can be regarded as appropriate noise events d33. As trains arrive only every 5-10 minutes, in order to make it possible to estimate the proportion of road and railroad noise impacts d33 in a given period, noise events d33 must be observed for periods of at least 30 minutes.

Time Windowing:

Applying overlapping time windows during time sectioning allows to filter out from the results many errors and disturbing transients but, of course, at a price, as overlapping time windows reduce time resolution by merging somewhat the successive results. It may also be an error in systems having several measuring points d13 that vehicles moving along line sources may reach the various stations with differences of even several seconds, which may be prevented by using time windows of an appropriately large scope and overlap, or else this difference must be compensated for somehow during processing. Several kinds of weighting can be applied in the overlapping parts of the time windows, e.g. linear attenuation windowing, which ensures that the results of more distant points in time, overlapping other periods, be taken into account with a smaller weight relative to the focused period.

Since the respective noise events d33 are put in summing unit d35 by noise event level units terminated at the end of the cycle, it may happen with noise events d33 at certain cycle borders that while the noise event appears in cumulative noise impact d31, during the summary it is assigned to another cycle; this problem can be solved perfectly by trapezoid time windows, following each other at 10 minute intervals, and comprising a 10 minute rising, a 10 minute linear and a 10 minute decreasing part. Of course, it is still commendable to divide noise events d33 with a time length close to that of the time window into several noise events.

Considerations Concerning the Data Processing Centre

Data Processing Functions:

The function of data processing centre F2 is to collect and process the source selective noise impact data d36 measured and processed by monitoring stations F1; to calculate with the help of the predefined noise propagation values d12 noise impact d38 prevailing at specific points of area K1; to draw noise map d38 and to make the necessary follow-up calculations.

Let's take an area K1 comprising a road, a railroad and a construction noise source d11, respectively; two reference measuring points d13 are designated on area K1, one installed next to the road and railroad crossing, the other along a more remote section of the road. Stations F1 keep measuring noise impact d31 and observing a32 the sources with their sensors M2-M3-K1-É1, and they sum up source selective noise impact data d36 every 20 minutes. The area is covered by a 100×100 measuring point grid; we want to define noise impact d38 at the grid points, and we also want to draw the result on a noise map every 20 minutes. Let's imagine a server connected to the two monitoring stations F1 installed on the field, querying source selective noise impact values d36 determined by stations F1 every 20 minutes. That means that the server is in possession of noise impact levels d36 of all three sources d11 valid in the two reference measurement points d13. We have already calculated previously with the help of model k12 the noise propagation difference values d12 between the 100×100 measuring point grid and the two reference points (implying 3×2×100×100 values), which can be used to determine noise impact d38 of the 10'000 measurement points by simple calculation, either separately, by source d11, or in summary, in every cycle. That is, every 20 minutes, following the take-over of the measurement data, station F2 makes propagation calculations a37, and then draws on the colour map noise impacts d38 of the measurement points, and transfers that noise map, updated every 20 minutes, to the users and/or stores it for future use. Database b21 created that way provides a good basis for the detailed statistical examination of the noise impact of the area.

Required Modules:

For the above, station F2 shall have appropriate data communication channels towards both monitoring stations F1 and the users, and it shall also comprise a data processing unit capable of performing the necessary calculations, and ensuring the efficient storage and accessibility of the results.

In most cases, data processing centre F2 and monitoring stations F1 are located far away in space from one another, so it is often more practical to use some wireless solution (WiFi, GSM etc.) instead of cable communication, or to connect both to a network through which they can reach one another (Internet, "cloud"). Undisturbed data communication is an essential precondition of adequate operation, as it is impossible to update the noise map in the absence of measurement data. Often the function of data storage, processing and forwarding can be fulfilled by a single well-equipped PC. This, however, requires the development of an adequate target application realising the proposed method, which can automatically perform the data querying, propagation calculation k12 and noise map dissemination functions, while also storing the created data in the meantime. Of course, these functions can be fulfilled also in a distributed system, or the collection F1, processing F2 and sharing F3 of the data can be accomplished by fully detached units, provided that there exists a data storage interface which is accessible by all three units.

Considerations Concerning the System of Decision-Making Rules

Decision-Making Function:

The function of source selection decision-making algorithm a22 is to divide the noise impact time function d31 measured on monitoring station F1 to a series of noise events d33, then to assign a34 to noise event d33 a noise source d11 on the basis of the available area information and measurement data t31-t32. That is, monitoring station F1 installed on area K1 affected by noise sources d11 which are not relevant from the point of view of the examination must be provided in advance with the list of the four source (group)s d11 responsible for noise events d33 as well as such source characteristics as can be linked to the values measured by instrument M1-R1-F11 and sensors M2-M3-K1-É1 of the monitoring station (e.g. their direction relative to the monitoring station, their typical time and frequency characteristics etc.). After that, based on the changes occurring in noise impact level d31 measured at station F1 and in the signals of sensors d32, station F1 marks the boundaries of the respective noise events, then by summing up the data collected during a given noise event d33 and collating them with the predesigned decision-making rule, it assigns a34 to them one of the four source (group)s.

Decision-Making Database:

The decision-making rule system is a database in which exactly one noise source d11 is assigned to each combination of measured data d31-d32. This can be conceived of as a multi-dimensional parameter in which the number of the dimensions corresponds to the number of independent data variables collected at monitoring station F1 (by measurement or from external source). The parameter space is a co-ordinate system the domain of which is the potential values of the variables collected on station F1, and its range is the identifier of the potential sources d11 responsible for noise events d33. For operating decision a22, a source identifier must figure in every interpretable point of the parameter space.

Let's suppose that we sample noise impact level d31, the ratios of the bottom, medium and upper band of the audible frequency range relative to the full level, the direction of sound d32 and movements d32 on the railroad line with the help of instrument M1-R1-F1/1 located on station F1 and sensors M2-M3-K1-É1. That means six parameters in all, but the ratios of the frequency sections are not independent, since they must make up one whole, so we can calculate with five independent parameters. Thus the database has to assign to all possible combinations of the five parameters one of the four sources (road, railroad, construction, irrelevant). Consequently, if noise impact levels d31 and frequency band ratios d32 are interpreted on five-point scales (negligible, weak, medium, intensive, outstanding), and three bands are designated for the direction of sound d32 (from the left, from the middle, from the right), and two states are distinguished for railway movement d32 (insignificant, significant), a total of 750 (5×5×5×3×2) independent combinations may occur. We have to fill these 750 slots with source d11 identifiers. For example: with an outstanding noise impact level d31, medium bottom and intensive medium frequency bands (the high one will be calculated as being weak on that basis), sound coming from the right associated with motion on the railroad, it can be assumed that a train has passed, so the railroad is assigned as source d34 to this parameter combination.

Setting the Rule System:

Decision-making rule system k22 can be developed in essentially three ways. In the fully manual case, the database is loaded directly by an expert with adequate skills, based on his own knowledge and studies. In semi-automatic learning mode of operation, the station carries out noise event delimiting a33 with its instrument M1-R1-F1/1 and sensors M2-M3-K1-É1, but it executes no source selection decision-making a34; instead, the operator with appropriate grounding taking part in the teaching provides manually at his discretion the source identifiers d34 for the respective noise events d33, hence as the various parameter combinations evolve during the process, the decision-making database is slowly built up. In automatic learning mode, an adequate number of control stations must be installed besides monitoring station F1. In this case, monitoring station F1 and data processing centre F2 fulfil all the measurement a21, decision-making a22 and calculation a23-a24 functions, and carry those out simultaneously for several decision-making cases, comparing the results to noise impacts d31 measured at the control stations, and records in the database the variant which produced the smallest measurement error.

That is, it is possible to assign to the 750 parameter combinations in the previous example one of the four sources d11 manually, or the system can be taught so that while the measurement is carried out, during every noise event d33, the operator pushes on the panel the button corresponding to the dominant source d11 ever in his opinion. Or, if say two control stations are installed besides monitoring station F1 at the examination points of relevance for us, the system put in automatic learning mode of operation will calculate during every noise event d33 the effective noise impact d38 of the control points for all four sources, then compare the four results to value 31 measured in the control points, and record in the database the decision which has led to the best result.

Considerations Concerning the Noise Map

Geographical Information System:

Noise map d38 is a drawing representing the spatial distribution of noise impacts d38 of an area. In the practice of noise prevention, however, a highly complex system has been built on this stripped definition. By now, noise impact map d38 has become a geographical information system b21 which comprises detailed information on sources d11 of the noise, the factors influencing noise propagation d12, the buildings to be protected and of course noise impact d38, its components d37 originating from various sources, the stakeholders, and its effects on the stakeholders. Consequently, the noise map is not simply an illustrative attachment to a paper, but it is an autonomous information system with the help of which the noise protection status of an area can be managed efficiently.

The best example we can show of the noise map is that of the strategic noise maps prepared and under preparation to this day in the EU Member States pursuant to the provisions of 2002/9/EC European Noise Directive (END) by teams of noise protection, geodesic and IT professionals to ensure that from urban management through public administration to the developers and buyerstenants, everyone should have sufficient information on the noise protection state of a settlement for adequate decision-making. As a result of the work, interactive geographical information systems have been created which mapped in detail and loaded with data the road, tramways and railroad lines, plant sources and buildings in need of protection of entire towns. In these systems, the noise impacts are accessible both by source and in cumulative form, and conflicts related to concernedness and the limit values can be queried. The finished systems have in several cases been integrated in the general geographical information systems of the settlements.

Noise mapping:

Noise map k12 can be made by noise modelling, which can determine, if noise sources d11 and propagation conditions d12 are known, the noise impacts d38 prevailing in the respective points of the area; in the simpler case, this can be made by spread-sheet calculations, but in most cases a dedicated application of some kind is needed. To make the noise map, noise impact d38 needs to be calculated at the points of the grid covering the examined area, and then it has to be drawn in the form of colour codes or contour lines of some kind. To improve quality, following the calculations, the grid resolution may be refined and the contour lines be developed by interpolation, otherwise they would be angular.

The best known commercially available noise modelling/noise mapping software products are the ones named IMMI, CADNAa and SoundPLAN, respectively, which can produce noise maps according to the relevant provisions of several countries. Although the calculation process changed but little in the past ten years, the applications are updated sometimes even several times a year, and services facilitating data entry and the use of the results are introduced. During noise mapping k12, these are exactly the processes requiring most engineering work, so it is most important whether a given software is compatible with the popular designer programms (e.g. AutoCAD, Microstation), the geographic information software products (e.g. Mapinfo, ArcView, PowerMap, MapView, Map 3D) and the increasingly popular Google products (e.g. GoogleEarth, SketchUp). Hence noise mapping k12 has become as much a geodesic and information issue by now as an acoustical one.

Analysis of Noise Maps:

Noise maps make it possible to analyse the noise protection state of area K1 in detail, and to observe such processes as would not necessarily be revealed by point-to-point calculations. If noise maps are available on several consecutive states of the area, then we can also follow with attention along the time axis the processes taking place there. If real-time noise maps are also available on a given area, we can also track such micro-processes as would be lost otherwise by the averaging process. Since the social effects of noise impact d38 are highly complex, the analysis of such micro-processes can increase the efficiency of noise protection to a significant extent. Thus noise impact d38 of a building can be calculated also by calculating exclusively noise impact d38 of a point designated on the façade of the building, and by evaluating the noise impact only on that basis. If, however, noise impact d38 of the area between source d11 and the building is mapped as well, we can obtain a more complete picture of the noise propagation d12 processes taking place. If new sources d11 or factors influencing noise propagation d12 appear, it is worth making the noise map anew, to be able to examine in what way the changes influenced the noise protection situation. If a real-time noise mapping system is also installed in the area, then we can also observe such processes as the daily, weekly and annual level changes of the noise impacts of traffic sources d37; noise impact d37 changes related to the production processes of a plant, or the temporary effects of a construction site. Those changes exert a significant influence on the general feelings of those concerned: starting a utility work machine at six in the morning will have a radically different effect from the same taking place at eight, and significant car traffic occurring with weekly regularity (e.g. in connection with events) may become highly disturbing in the long term, albeit it causes no significant change on annual average. Thus micro-process analysis can bring us closer to understanding the psychological effects of noise and hence the more accurate assessment of the real effects.

LIST OF REFERENCE SIGNS a00 automatic process
a11 automatic measuring cycle
a21 noise monitoring and source observation
a22 source identification
a23 source selective noise impact calculation
a24 noise map calculation
a31 noise measurement (sound pressure level measuring device)
a32 source observation (sensors)
a33 noise event identification
a34 source identification decision
a35 sorting of noise event levels
a36 determination of the average noise impact of sources
a37 source selective noise propagation calculation
a38 summary of source selective noise maps
b00 database
b11 system-describing database
b21 geographic information database
d00 datum
d11 list of dominant sources
d12 noise propagation coefficients
d13 list of reference measuring points
noise impact d31 level curve
d32 source characteristics
d33 time boundaries of noise events
d34 source identifier of noise events
d35 integrated noise impact of sources
d36 average noise impact of sources
d37 source selective noise map
d38 resultant noise map
k00 manual process
k11 area survey k12 noise propagation modelling
k13 designation of reference measurement points
k21 installation of monitoring stations
k22 setting of decision-making rules
k23 choise of cycle times
t31 noise impact data table
t32 source parameter data table
t33 noise event data table
t34 source selective noise impact data table
t35 noise map data table
A point
B point
E0 amplifier
É1 other detector systems
F0 processing unit
F1 monitor station
F2 central data processor unit
F2/1 noise impact data collector

The invention claimed is:

1. A method for source selective real-time monitoring and mapping of environmental noise, comprising the steps of:
surveying an area (k11), in a course of which sources (d11) must be identified which affect noise impact (d31) prevailing in respective points of the area (k11);
designing, in view of the sources (dl1), one or several measurement points (dl3) where monitoring stations (F1) are placed;
after the installation of the monitoring stations (F1), creating a data collecting and data processing center (F2),
measuring noise impact at the one or several measurement points (dl3), and observation of the sources (d11) with sensors (M2, M3, K1, Él); wherein
the sources (dl1) are grouped and they are treated together in subsequent separations; noise propagation conditions (d12) of the area (k11) are defined by noise modelling, during which the noise impact (d31) differences prevailing between respective measurement points of the area (k11) are determined for each source (d11), the one or several measurement points where the monitoring stations (F1) are placed are determined in view of a combined knowledge of sources (d11) and noise propagation conditions (d12);
in the course of the above, the one or several measurement points (d13) are defined so that each of the previously determined sources (d11) cause a significant noise impact in at least one measurement point (d13); subsequently, the monitoring stations (F1) are assembled so that a calibrated sound pressure level measuring device, a computing unit capable of a pre-processing of data and a communication unit capable of transmission of the data are assigned to each monitoring station (F1), and it is ensured that the sources (d11) contributing to the resultant noise impact (d31) in a dominant way are known at every moment and in every monitoring cycle;
following the installation of at least one monitoring station (F1), during the creation of a data collecting and data processing center (F2) firstly, the resultant noise impact (d31) prevailing in the respective one or several measurement points is determined by a summary of the data of one or several sound pressure level measuring devices, secondly, the sources (d11) dominant in individual moments in time are determined on the basis of the data of the one or several sensors located at the at least one monitoring station,
during which a dominance of the sources (d11) is inferred based on a specific parameter combination, by putting all the data of the sensors (É) into a single parameter space, and a decision is made;
on the basis of the resultant noise impact (d31) known for the respective moments and the also known source dominance, an average noise impact (d36) of the respective sources (d11) is determined selectively for a longer period; during which the noise impact measured at a given moment in time is assigned to the noise source (d11) identified by a previous decision, and resultant datum is stored in a summing unit of the noise source (d11),
at the end of a predefined period, the summing units are aggregated, the sum is divided over an entire monitoring period, and the average noise impact (d36) is obtained; whereby a specific average noise impact of every noise source (d11) is known for every period of monitoring;
thereafter, a measurement is extended into a noise impact map (d38), so that, since the noise impact (d36) of every noise source (d11) is known for every period, the noise impact difference between the points of the area (k11) is determined for every noise source (d11), the effective noise impact of every noise source (d11) in every point of the area (k11) is calculated for every monitoring period, subsequently, the noise impacts are summarised in every point, every period, for all the noise sources (d11), and on the basis of the resultant noise impact levels, a noise impact map (d38) of respective periods is produced.

2. The method according to claim 1, wherein the noise impact (d36) is measured continuously at the measurement points and respective sources (d11) are observed continuously by the sensors (É).

3. The method according to claim 1 wherein periodical noise impacts of the respective sources (d11) is determined and the noise impact map (d38) is calculated.

4. The method according to claim 1 wherein the noise impact map (d38) is updated in real time, by time period, an previously stored data is stored.

5. The method according to claim 1 wherein a posteriori statistical analysis is performed on a basis of the previously stored data.

6. The method according to claim 1 wherein the data collected at the one or several measurement points are extended a posteriori into a noise impact map (d38) by using noise impact difference values.

7. The method according to claim 1 wherein the noise sources (d11) are identified on a basis of their spatial location, with a direction-sensitive microphone system (M2, M3), based on their frequency and time characteristics and on visual signals.

8. The method according to claim 1 wherein the noise impact maps (d38) valid in specific periods are produced by assigning different colors to the resultant noise impact levels.

9. The method according to claim 1 wherein during installation, an identifier of the noise source (d11) which is dominant at a given moment is loaded manually, simultaneously with the measurement, and a sample series is associated with the data of sensors (É) and a system of decision-making rules is developed.

* * * * *